(12) United States Patent
Baude et al.

(10) Patent No.: US 8,930,379 B2
(45) Date of Patent: Jan. 6, 2015

(54) MERGING DISTRIBUTED MAIL INTO A UNIFIED FOLDER VIEW

(75) Inventors: Brent J. Baude, Rochester, MN (US); Jaroslaw Miszczyk, Rochester, MN (US); Kathryn Sintal, Waterford, PA (US); Gottfried Schimunek, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1594 days.

(21) Appl. No.: 11/563,787

(22) Filed: Nov. 28, 2006

(65) Prior Publication Data

US 2008/0126353 A1    May 29, 2008

(51) Int. Cl.
G06F 17/30    (2006.01)
G06Q 10/10    (2012.01)

(52) U.S. Cl.
CPC .................... *G06Q 10/107* (2013.01)
USPC .......................... 707/755; 707/756

(58) Field of Classification Search
USPC .................. 707/616, 672, 755, 756
See application file for complete search history.

(56) References Cited

U.S. PATENT DOCUMENTS

| | | | |
|---|---|---|---|
| 6,240,421 B1 | 5/2001 | Stolarz | |
| 7,027,463 B2* | 4/2006 | Mathew et al. | 370/463 |
| 7,747,579 B2* | 6/2010 | Prahlad et al. | 707/672 |
| 2002/0194209 A1* | 12/2002 | Bolosky et al. | 707/205 |
| 2004/0153479 A1 | 8/2004 | Mikesell et al. | |
| 2004/0158607 A1* | 8/2004 | Coppinger et al. | 709/206 |
| 2004/0212639 A1* | 10/2004 | Smoot et al. | 345/752 |
| 2005/0080861 A1* | 4/2005 | Daniell et al. | 709/206 |
| 2006/0047763 A1* | 3/2006 | Lin | 709/206 |
| 2006/0136911 A1* | 6/2006 | Robinson et al. | 718/1 |
| 2006/0149577 A1* | 7/2006 | Stashluk et al. | 705/1 |
| 2006/0168346 A1* | 7/2006 | Chen et al. | 709/246 |
| 2007/0233730 A1* | 10/2007 | Johnston | 707/104.1 |

FOREIGN PATENT DOCUMENTS

WO    WO03012699 A1    2/2003

OTHER PUBLICATIONS

ByungHoon Kang, Toward a Model of Self-administering Data, 2001, pp. 322-330.*
Microsoft Outlook 2003, 1 page.*
W. Geyer et al., "Supporting Activity-centric Collaboration Through Peer-to-Peer Shared Objects," 2003, pp. 115-124.
S. Berchtold et al., "SaveMe: A System for Archiving Electronic Documents Using Messaging Groupware," 1999, pp. 167-176.
B. Kang et al., "Toward A Model of Self-administering Data," 2001, pp. 322-330.
Y. Saito et al., "Optimistic Replication," 2005, pp. 42-81.
K. Rankin, "Virtual Folders in mutt," 2005, 3 pages.

* cited by examiner

*Primary Examiner* — Noosha Arjomandi
(74) *Attorney, Agent, or Firm* — Walter W. Duft (57) ABSTRACT

A technique for managing distributed email content uses metadata to identify the location of email maintained on one or more data storage resources. When processing email content for display, the metadata is consulted and a display output is generated that presents a unified email folder view in which the email is represented. Email may be represented in the unified email folder view regardless of whether the email's data storage resource is accessible. Email content that is not currently accessible may be identified as being inaccessible. The email may be identified in the unified email folder view by specifying the data storage resource on which it is stored. The unified email folder view may also include at least one email folder representation that merges email content from more than one data storage resource.

20 Claims, 10 Drawing Sheets

```
=>  INBOX

=>  SENT

=>  DRAFTS

=>  TRASH

=>  BUSINESS PARTNERS

O    APPLES

O    BAILEYS

O    ORANGES
```

```
=>   INBOX

=>   SENT

=>   DRAFTS

=>   TRASH

=>   BUSINESS PARTNERS

O    APPLES

O    BAILEYS

MESSAGE 1  <== RENDERED FROM USB KEY

MESSAGE 2  < == LOCAL COPY

MESSAGE 3  < == RENDERED FROM USB KEY

O    ORANGES
```
— 40

MERGING DISTRIBUTED MAIL INTO A UNIFIED FOLDER VIEW

BACKGROUND OF THE INVENTION

1. Field of the Invention

The present invention relates to the retention of electronic mail (email). More particularly, the invention is directed to the management of distributed email content maintained on plural data sources.

2. Description of the Prior Art

By way of background, the retention and management of email content is critical in the corporate workplace and business market. However, with most enterprise email solutions being based on protocols and methods wherein the email resides on a network server, retaining large volumes of mail can degrade the mail server performance and consume significant amounts of server storage. One option for the long term email retention is to save local copies of the email to user workstations. Although this eases the burden of storing and serving email on the mail server, that same burden is now placed on the users to safely retain the email without the reliability of typical enterprise storage systems. The burden of consuming disk storage is also transferred to the users. In addition, users may retain their local email copies at plural storage locations, such as user workstation hard drives, plug-in or removable storage media, local area network-connected storage systems, or other local area network hosts. Some of these storage locations (such as removable storage) may not always be "online" and accessible to the user workstations. This further complicates email management and makes searching across the local email copies a difficult and time-consuming task.

It would be desirable to provide an email retention solution that eases the burden of email storage on the server, eases the burden of email storage on the user, and allows email content retained on plural storage devices to be efficiently managed. What is particularly needed is a solution that provides quick, searchable methods to scan all email content, regardless of its location, and even if the content is retained on offline data sources.

SUMMARY OF THE INVENTION

The foregoing problems are solved and an advance in the art is obtained by a novel method, system and computer program product for managing distributed email content. Metadata is used to identify the location of email maintained on one or more data storage resources. When processing email content for display, the metadata is consulted and a display output is generated that presents a unified email folder view in which the email maintained on the one or more data sources is represented.

According to exemplary disclosed embodiments, the unified folder view may include email maintained on a default data storage resource. The email maintained on the default data storage resource may be represented with or without using the metadata, depending on design preferences. Email maintained on a data storage resource may be represented in the unified email folder view regardless of whether the data storage resource is accessible. Email content that is not currently accessible may be identified as being inaccessible. The email may be further identified in the unified email folder view by specifying the data storage resource on which it is stored. The unified email folder view may also include at least one email folder representation that merges email content from more than one data storage resource. The metadata may optionally include header information, together with user-defined information, for the email maintained on the one or more data storage resources. The metadata header information and user-defined information is available for display in the unified folder view without having to access the one or more data storage resources. The metadata may be updated when email content is placed on or removed from a data storage resource.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 1:
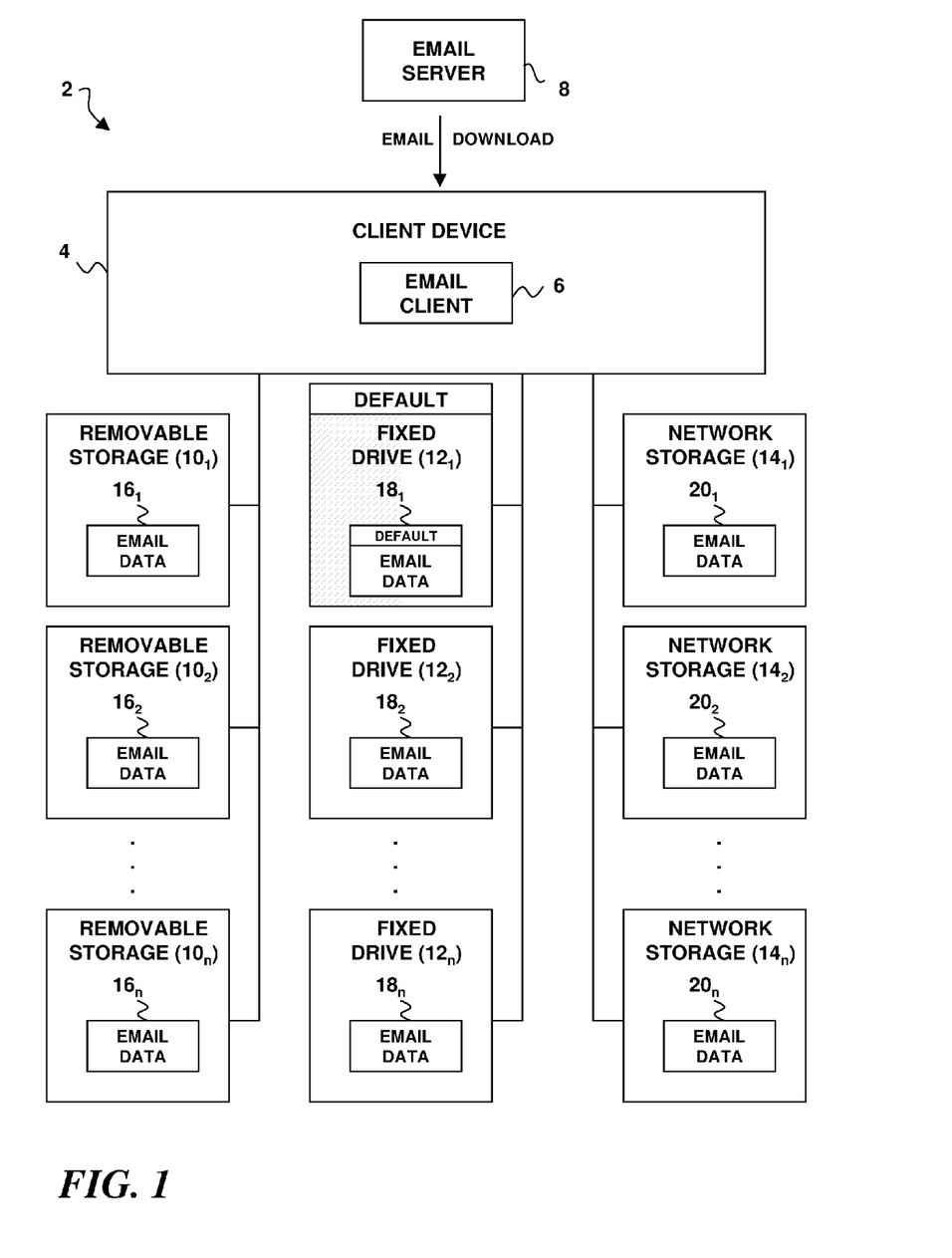
FIG. 1 is a functional block diagram showing an exemplary email client environment.

Turning now to the drawing figures, wherein like reference numerals indicate like elements in all of the several views, FIG. 1 illustrates an exemplary email client environment 2. In the environment 2, a client device 4 implements an email client 6 that cooperates with an email server 8 to provide email service on behalf of an email client user (not shown). Collectively, the client device 4 and email client 6 may embody any intelligent device, system or appliance capable of implementing the email client logic needed to interact with the email server 8. By way of example only, an exemplary implementation might comprise an email or email/web browser program running on a personal desktop computer, a workstation, a laptop computer, a cellular telephone or other handheld device, a web appliance or other embedded system, etc.

Figure 2:
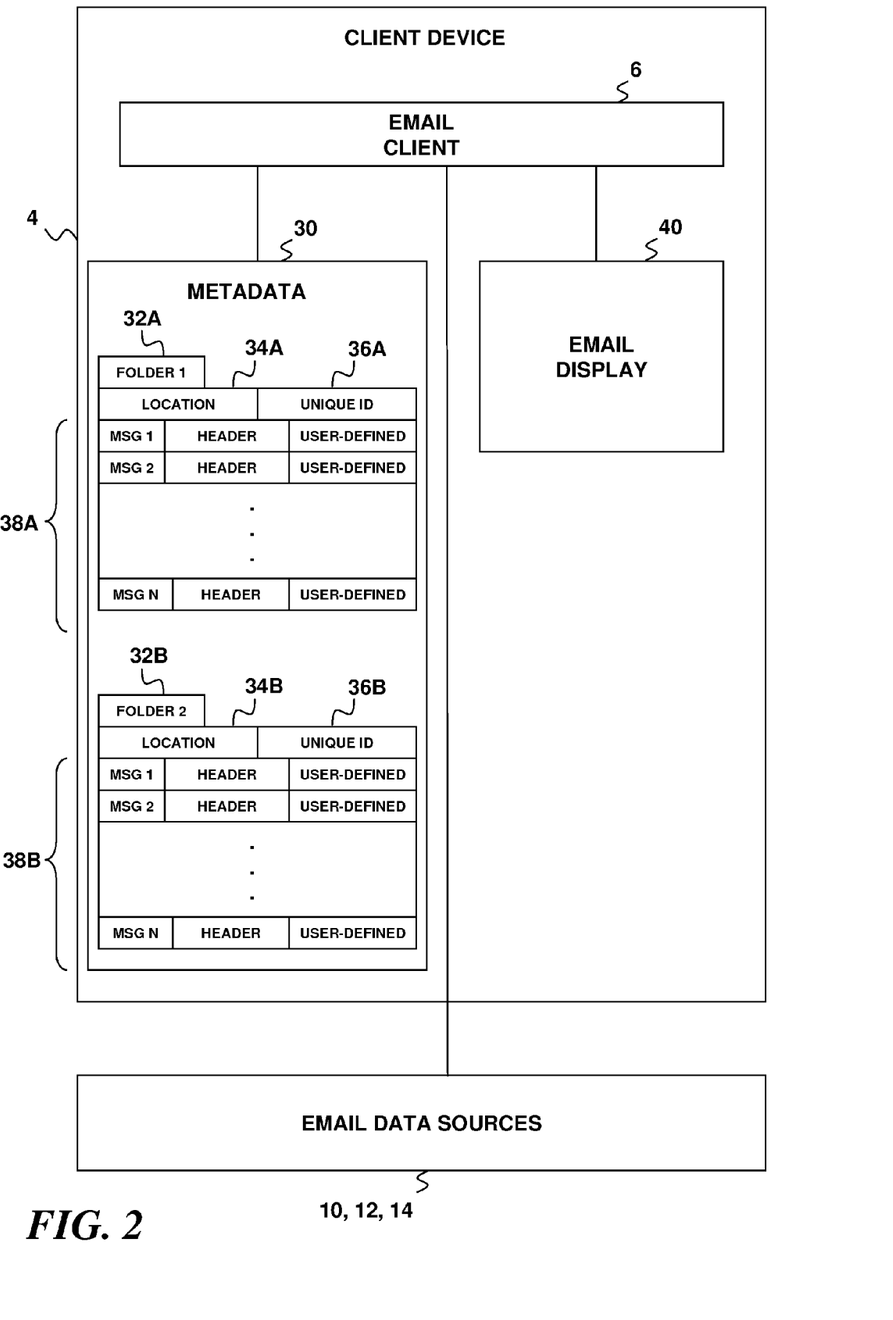
FIG. 2 is a functional block diagram shown an exemplary device hosting an email client in the email client environment of FIG. 1.

The email client 6 interacts with the email server 8 in conventional fashion in order to send and retrieve email messages. However, unlike conventional email clients, the email client 6 has the ability to store email content distributed over plural data storage resources and to present a unified view of that content to email client users. Exemplary data storage resources shown in FIG. 1 include a first data storage resource set $10_1, 10_2 \ldots 10_n$ that comprises one or more removable storage devices, a second data storage resource set $12_1, 12_2 \ldots 12_n$ that comprises one or more fixed storage devices, and a third data storage resource $14_1, 14_2 \ldots 14_n$ that comprises one or more network-attached storage devices. Any removable storage device could be represented in the storage resource set $10_1, 10_2 \ldots 10_n$ including USB keys, optical disks, removable magnetic disk drive units, tape cartridges, etc. Individual collections of email data $16_1, 16_2 \ldots 16_n$ are shown to be respectively stored on the data storage resources $10_1, 10_2 \ldots 10_n$. Any fixed storage device could be represented in the storage resource set $12_1, 12_2 \ldots 12_n$, including single-disk storage units, multi-disk storage subsystems, RAID arrays, JBOD arrays, etc. Individual collections of email data $18_1, 18_2 \ldots 18_n$ are shown to be respectively stored on the data storage resources $12_1, 12_2 \ldots 12_n$. The storage resource set $14_1, 14_2 \ldots 14_n$ may also include fixed or removable storage devices, but these devices will be accessed through a network rather than being directly connected to the client device 4. Such network resources could be situated at a single physical site or could be distributed over plural locations that are geographically diverse. Individual collections of email data $20_1, 20_2 \ldots 20_n$ are shown to be respectively stored on the data storage resources $14_1, 14_2 \ldots 14_n$. Although not shown, a further type of data storage resource that could be used to store email content would be a database storage system. It will also be appreciated that the email server 8 itself represents a data storage resource where email content is stored.

The stored email data may be represented as a set of one or more email folders, subfolders and/or individual email messages on each data source 10, 12 and 14 that maintains such data. Each email folder, subfolder or individual message can be maintained as a file system file entity, as is conventional. Commonly used email folders include an "Inbox" folder for incoming email, a "Sent" folder for outgoing email, a "Drafts" folder for email drafts, and a "Trash" folder for discarded email. In addition to these standard default folders, most email clients allow users to create custom folders that aid in email organization. Custom folders may be created as sub-folders of the default folders, or as top level peers thereof. Email content within each folder may be represented as a set of email messages, each of which comprises header information, a message body, and transmission-related information. The header information identifies the message sender, the message recipient(s), a message date, a message title, and possibly a message size. The message body contains the content of the message. The transmission-related information contains routing information, information about the sender's software environment, and other information. As far as known, conventional email clients are not capable of storing email messages individually apart from a folder. However, the email client 6 provides this capability through the use of email metadata, as described in more detail below.

A conventional email client typically stores all of its email folders on a single data storage resource, which is typically a fixed disk drive attached to the data processing system or device that hosts the email client. This drive may be referred to as the default email data source. As shown in FIG. 1, it will be assumed for discussion purposes only that the fixed drive $12_1$ in FIG. 1 is a default email data source, and that the email data $18_1$ includes files representing the default "Inbox," "Sent," "Drafts" and "Trash" folders. As is conventional, such files can be maintained in a single top-level email directory on the default data source $12_1$. If custom email folders have been created, their files may exist in subdirectories of the top-level email directory. Other email folder storage arrangements could also be used.

In order to display email content, a conventional email client presents a hierarchical view of all standard and custom email folders, which are listed by name. Each email folder (e.g., file) is parsed and the email header information for each email message is acquired so that it may be displayed as the email folders are individually selected by an email client user. When an individual email message (within a selected folder) is thereafter selected by the user, the email client retrieves the body of the email and displays the entire email message.

The email client 6 improves on the conventional email client functionality by providing the capability of managing email content distributed over multiple data sources, such as any of the data storage devices shown in FIG. 1 (hereinafter referred to as email data sources 10, 12 and 14), as well as the email server 8, in a manner that presents a unified view of all such email content to email client users. The email management functions of the email client 6 include the ability to maintain, merge, search and display the distributed email content. In order to provide this capability, the email client 6 uses metadata 30 (see FIG. 2) to track the location of the email maintained on the various email data sources 10, 12 and 14. The email tracked by the metadata 30 may include the default (and other) email folders maintained on the default data source $12_1$, although this is optional insofar as the email client 6 will normally know how to access such folders without having to consult metadata. For email folders, subfolders or individual messages on other (non-default) data sources, the metadata 30 allows the email client 6 to quickly determine where such email content may be found. One function of the metadata 30 is thus to identify the location of email maintained on one or more data storage resources. Email location information may include a drive identifier or mount point and a unique identifier to verify the data source. The email location information may further specify a file system entity (e.g., directory, file) on the data source where the email resides. The metadata 30 may also contain email header information, together with user-defined information that facilitates email organization and searching. As described in more detail below, maintaining header information in the metadata 30 allows the email client 6 to identify individual email messages (and display their header information) even when an email data source is inaccessible (e.g., a USB key is not plugged in). The user-defined information allows email content to be identified and organized in specified ways (as described in more detail below).

The metadata 30 can be implemented using any suitable data format and can be maintained on any of the data sources 10, 12 or 14. For example, as described in more detail below, the metadata 30 could be maintained in one or more email directories of the default data source $12_1$ (i.e., as placeholder stubs for the actual email content stored on other data resources). Maintenance of the metadata 30 could also be handled by a separate data processing device, such as a database management system (not shown). The metadata 30 may be organized in any desired fashion. FIG. 2 illustrates one exemplary approach in which the metadata is arranged on a folder by folder basis, with each folder being represented as a separate metadata file. Two folders 32A and 32B are illustrated. The folder 32A is labeled "Folder 1" and the folder 32B is labeled "Folder 2." For each of the folders 32A and 32B, a data storage location 34A or 32B is specified, together with a unique identifier 36A or 36B. Each metadata folder 32A and 32B also includes email header information and user-defined information for a set of messages 38A or 38B labeled MSG 1, MSG 2 . . . MSG N. Other data organization formats could also be used for arranging the metadata 30, as described in more detail below.

Figure 3:
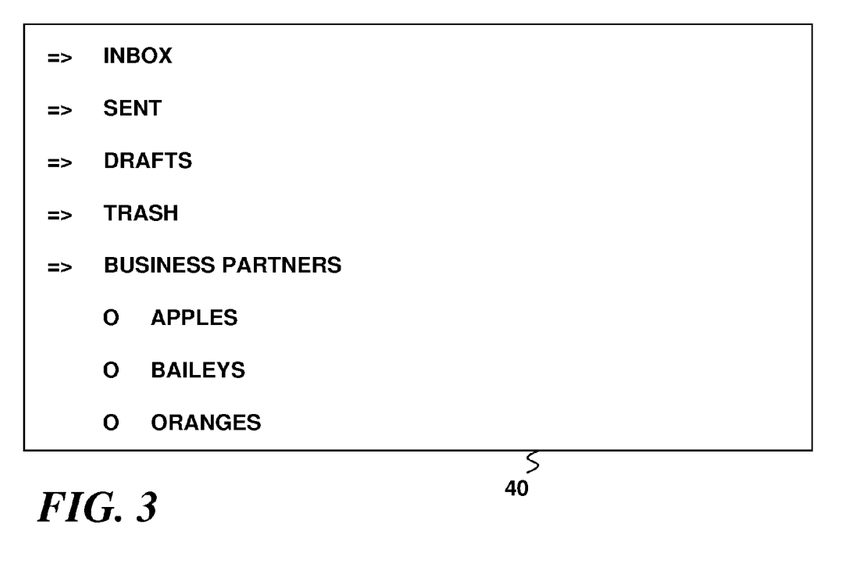
FIG. 3 is a diagrammatic illustration of an exemplary display output that presents a unified email folder view of email maintained on different data sources.
Figure 4:
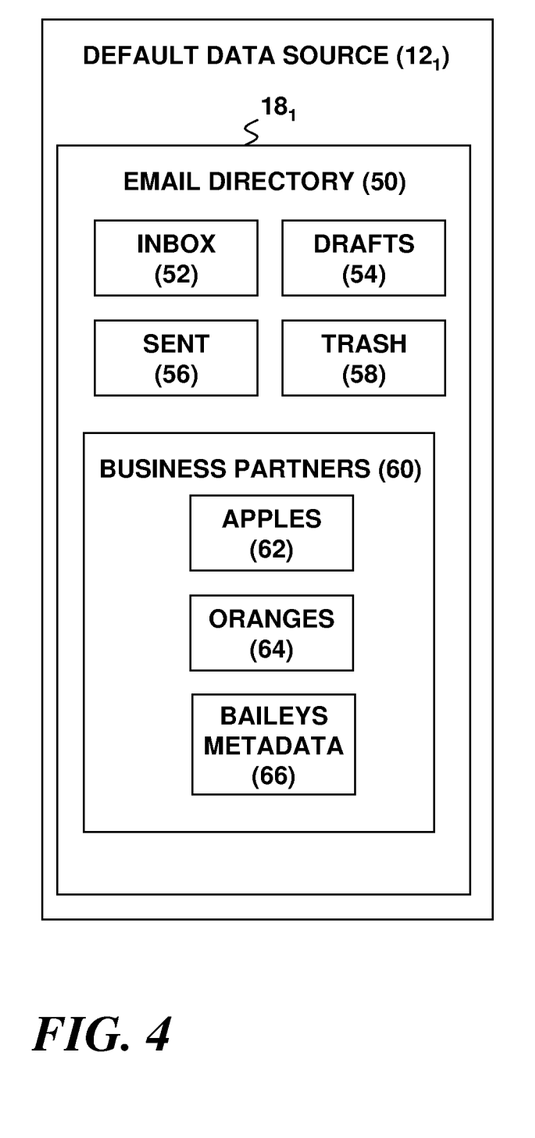
FIG. 4 is a functional block diagram showing exemplary default email folders maintained on a default data storage resource.

The email client 6 uses the metadata 30 to generate a display output 40 that presents a unified email folder view in which email folders maintained on the email data sources 10, 12 and 14 may all be represented. The display output 40 may be graphical or text-based. FIG. 3 represents an example of how the display output 40 might appear. In this example, there is a set of default email folders that are assumed to be part of the email data $18_1$ maintained on the default data source $12_1$, as shown in FIG. 4. These default email folders may be located in a top-level email directory 50. The email data $18_1$ thus includes an "Inbox" folder 52, a "Sent" folder 54, a "Drafts" folder 56 and a "Trash" folder 58. The email data $18_1$ also includes a custom user-created folder 60 labeled "Business Partners." Within the "Business Partners" folder 60 are two folders 62 and 64 respectively bearing the subject matter labels "Apples" and "Oranges." There is also a metadata folder 66 bearing the subject matter label "Baileys." The "Baileys" metadata folder 66 contains metadata 30 for a "Baileys" folder that is not maintained on the default data source $12_1$. Thus, the "Baileys" metadata folder 66 is a placeholder stub for the real "Baileys" folder containing the actual email content. The "Baileys" metadata folder 66 could be represented by either of the metadata folders 32A or 32B shown in FIG. 2.

Figure 5:
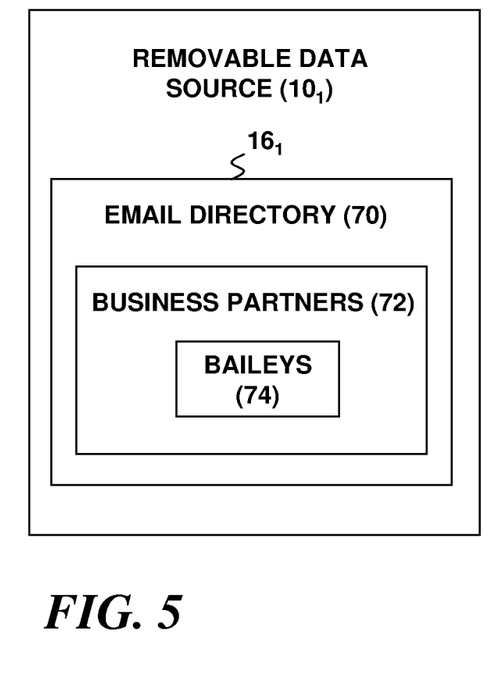
FIG. 5 is a functional block diagram showing exemplary email folders maintained on a non-default data storage resource.

As shown in FIG. 5, it is assumed that a user of the email client 6 has designated the email data $16_1$ maintained on the removable data source $10_1$ for storing additional custom email folders. These folders can be maintained at any suitable location on the data source $10_1$, such as within an email directory 70 and a subdirectory folder 72 labeled "Business Partners." A folder 74 within the "Business Partners" folder 72 is labeled "Baileys" and corresponds to the "Baileys" metadata folder 66 shown in FIG. 4. The "Baileys" folder 74 could have been created by an email client user on the default data source $12_1$ and thereafter backed up to the removable data source $10_1$ (which might be a USB key). Alternatively, the "Baileys" folder 74 could have been initially created on the removable data source $10_1$. It should be understood that the placement of the "Baileys" folder 74 within the higher level directories 70 and 72 is shown for purposes of illustration only, and that these directories are not necessary for proper storage of the "Baileys" folder.

In the display output 40 of FIG. 3, the "Baileys" folder 74 from the removable data source $10_1$ is merged into the business partners folder along with the "Apples" and "Oranges" folders 62 and 64 from the default data source $12_1$. The email client 6 can be implemented to perform this merging operation based on a determination that the "Baileys" metadata folder 66 and the "Apples" and "Oranges" folders 62 and 64 reside in a common parent directory having the same name, i.e., "Business Partners." Similarly, if the "Baileys" metadata folder 66 resided in some other directory on the default data source $12_1$, the "Baileys" folder 74 could have been inserted at a different location in the display output 40. As an alternative to the foregoing folder placement scheme, the "Baileys" metadata folder 66 could itself identify the proper location in which to insert the "Baileys" folder in the display output 40. In that case, all metadata folders could be stored as a group in a single location and the email client 6 could be implemented to determine the correct folder placement from information contained within each folder's metadata.

The same scheme can be used for email content that is stored individually on a data storage resource, and not by folder or subfolder. For example, instead of storing the entire "Baileys" folder 74 on the data source $10_1$, an email client user may wish to store only individual messages, or groups of messages, perhaps by transferring such messages from several different folders on the default data source $12_1$. This could occur as a result of the email client user applying a search criterion and transferring email messages located by the search. Such a search might be used, for example, to transfer all email messages having large attachments, thereby freeing up storage space on the default data source $12_1$. In this example, the transferred email messages could be stored individually or as a group on the data source $10_1$. The metadata for each such email message could then be stored as an entry in a file on the default data source $12_1$ that represents the folder from which the email message originated. When the email client 6 parses that file for display, it would encounter the metadata entry (a placeholder stub) and use the information therein to retrieve the actual email message stored on the data source $10_1$. Alternatively, if the metadata 30 is stored as a group in a single location (as mentioned above), the metadata for each email message could identify the proper location in which to insert the message in the display output 40. This might be the original folder from which the message was transferred. Alternatively, the metadata could define some other folder view in which to display the message, such as a user-defined category (e.g., project name, workgroup, all email messages with large attachments, etc.).

Figure 6A:
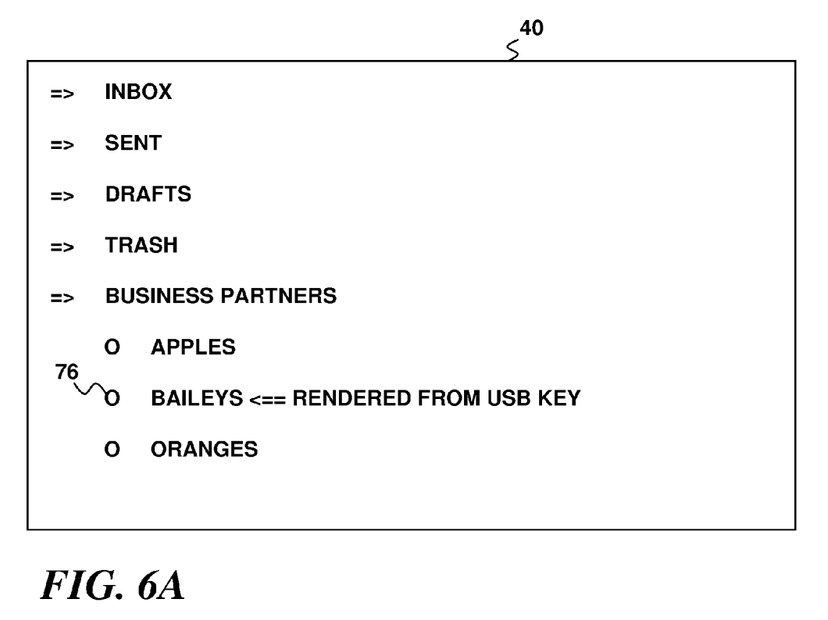
FIG. 6A is a first alternative illustration of the display output of FIG. 3.
Figure 6B:
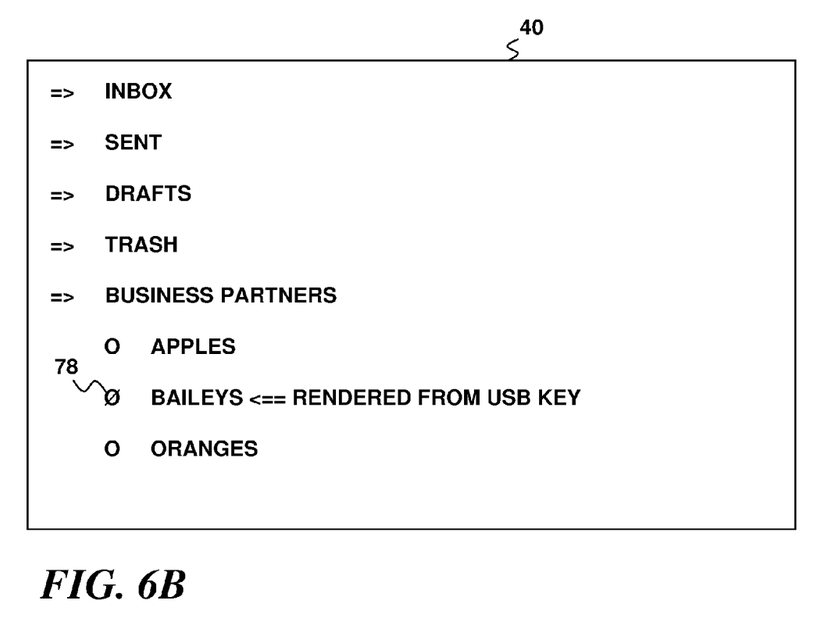
FIG. 6B is a second alternative illustration of the display output of FIG. 3.

The display output 40 of FIG. 3 represents one example of a unified view (that can be presented to an email client user) of the email content maintained on both the default data source $12_1$ and the removable data source $10_1$. If email content was stored on any of the other data sources 10, 12 and 14, it too could be displayed in a like manner. Further display options are shown in FIGS. 6A and 6B. In FIG. 6A, the data source $10_1$ of the "Baileys" sub-folder 74 is identified in order to advise the email client user that this sub-folder is not from the default data source $12_1$. A data source accessibility indicator, such as the "O" symbol 76, may be used to signify that the data source $10_1$ is accessible to the email client 6. For example, if the data source $10_1$ is a USB key, the symbol 76 would signify that the device is plugged in and has been recognized by the underlying operating system. In FIG. 6B, an "Ø" symbol 78 is used to signify that the data source $10_1$ is not accessible. Thus, if the data source $10_1$ is a USB key, the symbol 78 would signify that device is either not plugged in or has not been recognized by the underlying operating system. Other data source accessibility indicators could also be used, such as a different fonts or colors, or separate text that states whether the data source is accessible.

Figure 7A:
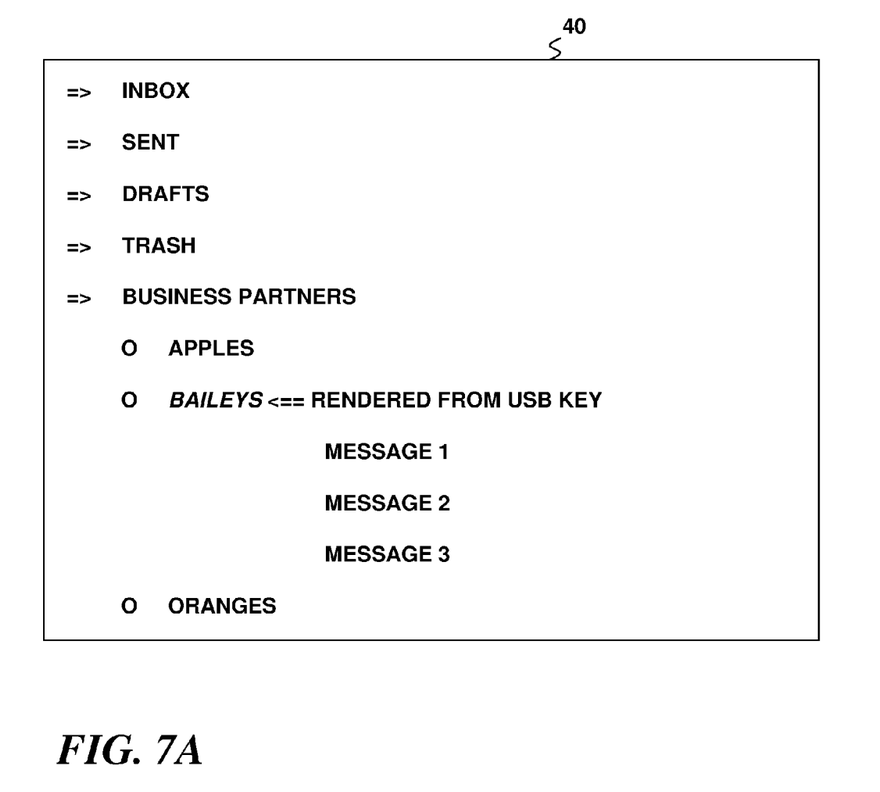
FIG. 7A is a first alternative illustration of the display output of FIG. 3 following selection of one of the email folders therein.
Figure 7B:
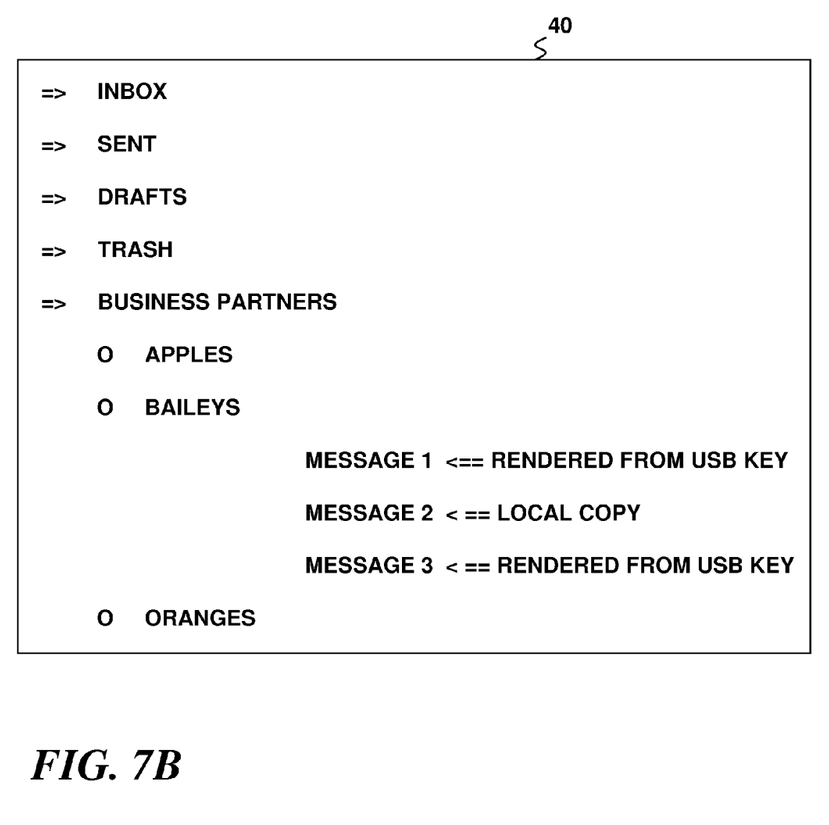
FIG. 7B is a second alternative illustration of the display output of FIG. 3 following selection of one of the email folders therein.

FIGS. 7A and 7B provide examples of how the display output 40 might appear when a user of the email client 6 selects the "Baileys" folder 74 for display (the selection being shown by the italicized "Baileys" label). FIG. 7A illustrates the case where all of the email messages of the "Baileys" folder 74 reside on the removable data source $10_1$. FIG. 7B illustrates a different case the email content of the "Baileys" folder has been divided between the removable data source $10_1$ and the default data source $12_1$. As described above, this could occur if an email client user desired to offload only some of the "Baileys" folder email content to the removable data source $10_1$. In this situation, the email client 6 merges the email messages from each source into a single "Baileys" folder view in the display output 40. Each email message within this folder may then be identified to show the data source from which it came. Although not shown in FIG. 7B, a further identifier could be used in association with each message rendered from the removable data source $10_1$ to designate whether that data source is accessible. If the "Baileys" metadata 66 (see FIG. 4) includes user-defined information, this information could be used to further customize the display output 40. For example, the user-defined information could specify whether email messages are confidential. The views of FIGS. 7A and 7B could then be modified to identify all confidential messages in the "Baileys" folder. The user-defined information could also group email messages according to user-specified categories, such as project name, workgroup, etc. Search result displays could then be generated based on searching email messages according to the user-specified categories.

Figure 8:
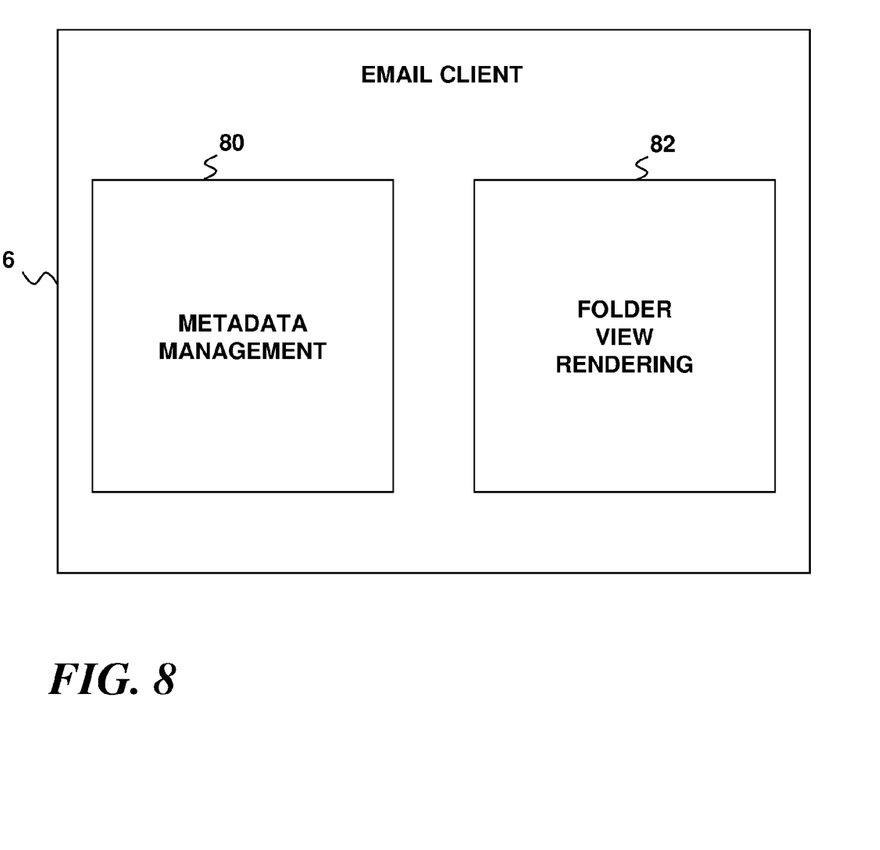
FIG. 8 is a functional block diagram showing exemplary components of the email client shown in FIG. 1.

Turning now to FIG. 8, the email client 6 is shown to implement metadata management logic 80 and folder view-rendering logic 82 as part of its functionality. The metadata management logic 80 is responsible for creating and maintaining the metadata 30. New metadata 30 can be created whenever email content is added to a non-default data source, such as the removable data source $10_1$. This may occur in several ways. For example, a user of the email client 6 may decide to move an email folder (or individual messages therein) on the default data source $12_1$ to the removable data source $10_1$. Modern email clients typically provide support for moving and copying email folders from one directory to another on a single disk drive. The email client 6 can be readily adapted to extend this move/copy functionality by allowing folders (or individual messages or groups of messages) to be moved or copied between different data sources. As part of the extended move/copy functionality of the email client 6, the logic 80 may be implemented to create or update the metadata 30 to reflect each move/copy operation that involves the placement or removal of email on a non-default data source. As described above, the metadata 30 will identify the location of the associated email content, and may also include email header information and user-defined information. The email location and header information can be automatically generated by the logic 80 as the metadata 30 is created or updated. In order to create user-defined metadata, the logic 80 may be adapted to generate a pop-up display or other user interface that allows an email client user to specify the user-defined information, either by folder, by message, or both. The logic 80 may also be invoked to update the metadata 30 when a new folder is created on a non-default data source, or when new email content is sent or received and message filtering logic in the email client 6 (not shown) determines that the new content belongs in a folder on a non-default data source. Whenever the metadata management logic 80 performs an update to the metadata 30, it may notify the folder view-rendering logic 82 so that the display output 40 can be refreshed.

The folder view-rendering logic 82 is responsible for consulting the metadata 30 and using the information therein to build a unified email folder view in the display output 40. This logic may be invoked when the email client 6 is started, whenever notification of a metadata update is received from the metadata management logic 80, and whenever a data source is added or removed. In the first case, the logic 82 is implemented synchronously as part of the email client's initialization process. In the second case, the logic 82 is implemented asynchronously following receipt of the notification from the metadata management logic 82. The third case also results in asynchronous invocation of the logic 82. In particular, the logic 82 may be invoked in response to the email client 6 detecting an underlying operating system event that is of interest, such as the addition of a new drive or mount point for a data source identified in the metadata 30. Each time the logic 82 is invoked in this manner, available data sources that have not been previously verified during the current session of the email client 6 are validated to check the consistency of the metadata that describes the data source email content. The display output 40 is then populated according to the availability of data sources and the current content of the metadata 30.

If desired, the email client 6 could be adapted to generate a pop-up window or other indicator whenever a data source is added or removed in order to notify the email client user that a change in available email content has occurred and that the logic 82 is processing a display update. In order to handle the case where a data source is added or removed but the display output 40 is not refreshed by the logic 82, the email client 6 may be adapted to provide a user-selectable interface, such as a pop-up menu, that allows the email client user to manually specify the added or removed data source, or alternatively, to request that an automated data source synchronization check be performed.

As described above, the metadata 30 identifies the location of email maintained on one or more data sources. It may also contain email header information. In the event that the metadata 30 contains only email location information, the logic 82 may use the location information to fetch email header information directly from the data sources 10, 12 and 14. If there is any email on a data source that is inaccessible, the logic 82 will not be able to render the email header information for that email. On the other hand, if the metadata 30 does contain email header information, the logic 82 can present this information in the display output 40, even if a data source cannot be accessed. For this type of metadata 30, the logic 82 will not have to access the data sources themselves until an individual email message is selected for viewing. When this occurs, the logic 82 will use the email location information to fetch the selected message.

Figure 9:
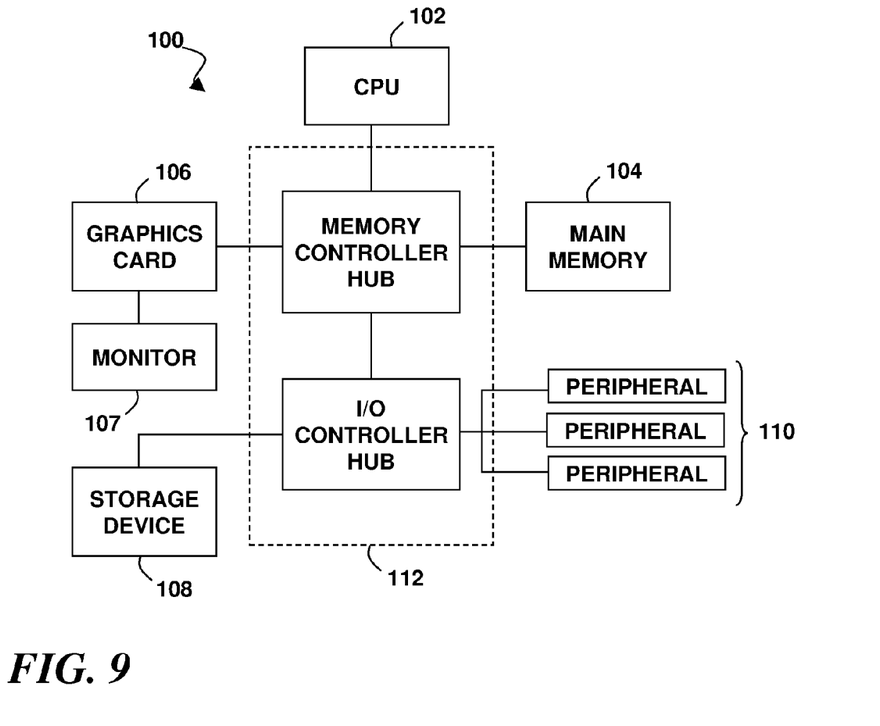
FIG. 9 is a functional block diagram showing exemplary data processing hardware that may be used to provide a system for implementing email management in accordance with the disclosure herein.

Accordingly, a technique has been disclosed for managing distributed email content on plural data sources. It will be appreciated that the inventive concepts may be variously embodied in any of a data processing system, a machine implemented method, and a computer program product in which programming logic is provided on one or more data storage media for use in controlling a data processing system to perform the required functions. Relative to a data processing system and machine implemented method, FIG. 9 illustrates an exemplary hardware environment 100 in which the email client 6 may be implemented. The hardware environment 100 includes a CPU or other data processing resource 102, a main memory 104, a graphics card 106 for generating visual output information to a display monitor 107, a peripheral storage device 108, other peripheral devices 110, and a bus infrastructure 112 interconnecting the foregoing elements. The email client 6 may be loaded in the main memory 104. The metadata 30, or portions thereof, will also be brought into the main memory 104 during metadata processing. The storage device 108 may be used as persistent storage for the metadata 30. It may also be used as the default data source $12_1$. Other data sources, such as the removable storage devices $10_1$-$10_n$, the fixed storage devices $10_2$-$12_n$, and the network storage devices $14_1$-$14_n$, may be accessed through I/O (Input/Output) resources provided by the peripheral devices 110, which may include a USB bus controller, a SCSI disk controller, and a network interface card. The monitor 107 may be used to present the display output 40.

Figure 10:
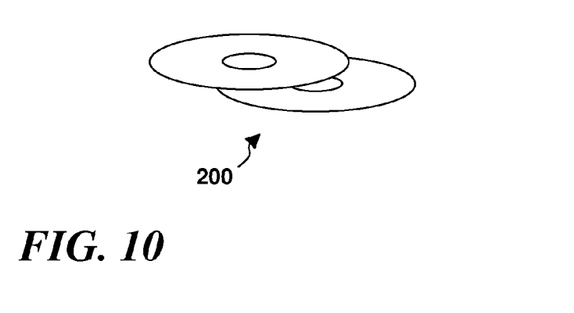
FIG. 10 is a diagrammatic illustration showing exemplary media that may be used to provide a computer program product for implementing email management in accordance with the disclosure herein.

Relative to a computer program product having a machine-readable media and programming logic, exemplary data storage media for storing the programming logic are shown by reference numeral 200 in FIG. 10. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A method for managing distributed email content, comprising: an email client downloading email content from an email server for display by said email client, said email content comprising email messages that each include a message header; said email client storing all or a portion of said email content on one or more data storage resources that are not a default storage device used by said email client; said email client generating metadata that identifies the current location of said email content on said one or more data storage resources; said email client storing said metadata separately from said email content stored on said one or more data storage resources so that said metadata is accessible to said email client even if said one or more data storage resources are not accessible; said email client consulting said metadata to determine said current location of said email content stored on said one or more data storage resources; and said email client generating a display output that presents a unified email folder view in which said email content whose current location is identified by said metadata is visually represented by one or more email message headers in one or more email folder representations.

2. The method of claim 1 wherein said unified email folder view includes email content maintained on said default storage device.

3. The method of claim 1 wherein said email content is represented in said unified email folder view regardless of whether said one or more data storage resources are accessible, and email content that is not currently accessible is identified as being inaccessible.

4. The method of claim 1 wherein said email content is identified in said unified email folder view as being stored on said one or more data storage resources.

5. The method of claim 1 wherein said unified email folder view comprises at least one email folder representation that merges email content from more than one data storage resource.

6. The method of claim 1 wherein said metadata comprises one or both of header information and user-defined information for email content on said one or more data storage resources.

7. The method of claim 1 wherein said metadata is updated when email content is placed on or removed from said one or more data storage resources and said unified email folder view is synchronously or asynchronously updated to reflect said updated metadata.

8. A data processing system for managing distributed email content, comprising: data processing system hardware operative to implement an email client; program logic executed by said email client to perform operations, said operations including: said email client downloading email content from an email server for display by said email client, said email content comprising email messages that each include a message header; said email client storing all or a portion of said email content on one or more data storage resources that are not a default storage device used by said email client; said email client generating metadata that identifies the current location of said email content stored on said one or more data storage resources; said email client storing said metadata separately from said email content stored on said one or more data storage resources so that said metadata is accessible to said email client even if said one or more data storage resources are not accessible; said email client consulting said metadata to determine said current location of said email content stored on said one or more data storage resources; and said email client generating a display output that presents a unified email folder view in which said email content whose current location is identified by said metadata is visually represented by one or more email message headers in one or more email folder representations.

9. The method of claim 8 wherein said unified email folder view includes email content maintained on said default storage device.

10. The method of claim 8 wherein said email content is represented in said unified email folder view regardless of whether said one or more data storage resources are accessible, and email content that is not currently accessible is identified as being inaccessible.

11. The method of claim 8 wherein said email content is identified in said email folder view as being stored on said one or more data storage resources.

12. The method of claim 8 wherein said unified email folder view comprises at least one email folder representation that merges email content from more than one data storage resource.

13. The method of claim 8 wherein said metadata comprises one or both of header information and user-defined information for email content on said one or more data storage resources.

14. A computer program product for managing distributed email content, comprising: one or more non-transitory machine-readable media; programming logic provided on said machine-readable media for programming a data processing apparatus to operate as as an email client by: said email client downloading email content from an email server for display by said email client, said email content comprising email messages that each include a message header; said email client storing all or a portion of said email content on one or more data storage resources that are not a default storage device used by said email client; said email client generating metadata that identifies the current location of said email content stored on said one or more data storage resources; said email client storing said metadata separately from said email content stored on said one or more data storage resources so that said metadata is accessible to said email client even if said one or more data storage resources are not accessible; said email client consulting said metadata to determine said current location of said email content stored on said one or more data storage resources; and said email client generating a display output that presents a unified email folder view in which said email content whose current location is identified by said metadata is visually represented by one or more email message headers in one or more email folder representations.

15. The computer program product of claim 14 wherein said unified email folder view includes email content maintained on said default storage resource.

16. The computer program product of claim 14 wherein said email content is represented in said unified email folder view regardless of whether said one or more data storage resources are accessible, and email content that is not currently accessible is identified as being inaccessible.

17. The computer program product of claim 14 wherein said email content is identified in said unified email folder view as being stored on said one or more data storage resources.

18. The computer program product of claim 14 wherein said unified email folder view comprises at least one email folder representation that merges email content from more than one data storage resource.

19. The computer program product of claim 14 wherein said metadata comprises one or both of header information and user-defined information for email content on said one or more data storage resources.

20. The computer program product of claim 14 wherein said metadata is updated when email content is placed on or removed from said one or more data storage resources and said unified email folder view is synchronously or asynchronously updated to reflect said updated metadata.

* * * * *